United States Patent
Raskin et al.

(10) Patent No.: US 9,684,805 B2
(45) Date of Patent: Jun. 20, 2017

(54) METHOD AND APPARATUS FOR SECURING COMPUTER INTERFACES

(71) Applicant: JANUS TECHNOLOGIES, INC., Half Moon Bay, CA (US)

(72) Inventors: Sofin Raskin, Los Altos, CA (US); Michael Wang, Taipei (TW); Joshua Porten, Austin, TX (US); Alexander Indenbaum, Bat Hefer (IL); Shaoan Chin, Cupertino, CA (US)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 33 days.

(21) Appl. No.: 13/971,582

(22) Filed: Aug. 20, 2013

(65) Prior Publication Data

US 2015/0058912 A1 Feb. 26, 2015

(51) Int. Cl.
*G06F 21/85* (2013.01)
*H04L 29/06* (2006.01)
*G06F 1/16* (2006.01)

(52) U.S. Cl.
CPC ............ *G06F 21/85* (2013.01); *G06F 1/1698* (2013.01); *H04L 63/1433* (2013.01)

(58) Field of Classification Search
CPC ... H04L 47/20; H04L 147/2416; G06F 13/36; G06F 2213/0028
See application file for complete search history.

(56) References Cited

U.S. PATENT DOCUMENTS

| | | | |
|---|---|---|---|
| 4,598,170 | A | 7/1986 | Piosenka et al. |
| 5,191,542 | A | 3/1993 | Murofushi |

(Continued)

FOREIGN PATENT DOCUMENTS

| | | |
|---|---|---|
| EP | 2517144 | 7/2011 |
| EP | 2407905 | 1/2012 |
| WO | 2011-145095 | 11/2011 |

OTHER PUBLICATIONS

Garfinkel, "Terra: A Virtual Machine-Based Platform for Trusted Computing", ACM SOSP, Proc. Of the ACM Symp. On Operating system Printciples, Oct. 22, 2003, pp. 193-206.

(Continued)

*Primary Examiner* — Trang Doan
(74) *Attorney, Agent, or Firm* — Foley & Lardner LLP; Mark J. Danielson

(57) ABSTRACT

The present invention relates to methods and apparatuses for securing otherwise unsecured internal and external computer communications. According to one aspect, the invention relates to methods and apparatuses for implementing device gatekeeping. According to another aspect the invention relates to methods and apparatuses for encrypting and decrypting data sent over an external or internal interface. According to another aspect, the invention relates to methods and apparatuses for implementing device snooping, in which some or all traffic passing between a host and a connected device is captured into memory and analyzed in real time by system software. In embodiments, the software can also act upon analyzed information. According to certain additional aspects, the security functions performed by methods and apparatuses according to the invention can be logically transparent to the upstream host and/or to the downstream device.

21 Claims, 6 Drawing Sheets

(56) References Cited

U.S. PATENT DOCUMENTS

| | | | |
|---|---|---|---|
| 5,724,027 A | 3/1998 | Shipman et al. | |
| 5,946,469 A | 8/1999 | Chidester | |
| 6,061,794 A | 5/2000 | Angelo et al. | |
| 6,088,802 A | 7/2000 | Bialick et al. | |
| 6,457,164 B1 | 9/2002 | Hwang et al. | |
| 6,507,914 B1 | 1/2003 | Cain et al. | |
| 6,546,491 B1 | 4/2003 | Challener et al. | |
| 6,594,780 B1 | 7/2003 | Shen et al. | |
| 6,725,438 B2 | 4/2004 | Van Ginneken | |
| 6,782,424 B2 | 8/2004 | Yodaiken | |
| 6,804,727 B1* | 10/2004 | Rademacher | G06F 3/1204 710/305 |
| 6,820,160 B1 | 11/2004 | Allman | |
| 6,922,817 B2 | 7/2005 | Bradfield et al. | |
| 7,120,892 B1 | 10/2006 | Knol et al. | |
| 7,149,992 B2 | 12/2006 | Chang et al. | |
| 7,240,303 B1 | 7/2007 | Schubert | |
| 7,266,842 B2* | 9/2007 | Foster | G06F 21/85 713/190 |
| 7,320,071 B1 | 1/2008 | Friedman et al. | |
| 7,330,891 B2 | 2/2008 | Yodaiken | |
| 7,337,100 B1 | 2/2008 | Hutton et al. | |
| 7,340,700 B2 | 3/2008 | Emerson | |
| 7,350,204 B2 | 3/2008 | Lambert et al. | |
| 7,396,257 B2 | 7/2008 | Takahashi | |
| 7,469,343 B2 | 12/2008 | Ray | |
| 7,478,235 B2 | 1/2009 | England et al. | |
| 7,516,217 B2 | 4/2009 | Yodaiken | |
| 7,635,272 B2 | 12/2009 | Poppe | |
| 7,677,065 B1 | 3/2010 | Miao | |
| 7,734,933 B1* | 6/2010 | Marek | G06F 21/57 711/173 |
| 7,962,755 B2 | 6/2011 | Pizano et al. | |
| 7,987,497 B1 | 7/2011 | Giles et al. | |
| 8,127,059 B1* | 2/2012 | Carr | G06F 13/387 710/74 |
| 8,402,529 B1 | 3/2013 | Green et al. | |
| 8,429,419 B2 | 4/2013 | Endrys | |
| 8,566,934 B2 | 10/2013 | Srivastava et al. | |
| 8,606,971 B2 | 12/2013 | Cain et al. | |
| 8,627,106 B2 | 1/2014 | Pizano et al. | |
| 2001/0039579 A1* | 11/2001 | Trcka | G06F 21/552 709/224 |
| 2002/0007456 A1 | 1/2002 | Peinado et al. | |
| 2002/0069396 A1 | 6/2002 | Bhattacharya et al. | |
| 2004/0003262 A1* | 1/2004 | England | G06F 21/606 713/189 |
| 2004/0003277 A1 | 1/2004 | Rabeler | |
| 2004/0107340 A1* | 6/2004 | Wann | H04L 9/06 713/153 |
| 2004/0153696 A1* | 8/2004 | Govindaraman | G06F 1/3203 714/4.21 |
| 2004/0199879 A1 | 10/2004 | Bradfield | |
| 2005/0240892 A1 | 10/2005 | Broberg et al. | |
| 2006/0179144 A1* | 8/2006 | Nagase | G06F 13/387 709/226 |
| 2007/0219748 A1* | 9/2007 | Iwasa | G06F 11/0745 702/182 |
| 2007/0255963 A1 | 11/2007 | Pizano et al. | |
| 2008/0091833 A1 | 4/2008 | Pizano et al. | |
| 2008/0247540 A1 | 10/2008 | Ahn et al. | |
| 2008/0263658 A1 | 10/2008 | Michael et al. | |
| 2008/0276302 A1* | 11/2008 | Touboul | G06F 21/562 726/3 |
| 2009/0013111 A1 | 1/2009 | Berland et al. | |
| 2009/0033668 A1 | 2/2009 | Pederson et al. | |
| 2009/0049307 A1* | 2/2009 | Lin | G06F 21/72 713/185 |
| 2009/0113202 A1* | 4/2009 | Hidle | H04L 63/0428 713/151 |
| 2009/0144536 A1* | 6/2009 | Chen | G06F 21/575 713/2 |
| 2009/0212844 A1 | 8/2009 | Darmawan et al. | |
| 2009/0222685 A1* | 9/2009 | Foster | G06F 1/14 713/500 |
| 2010/0024004 A1 | 1/2010 | Boegelund et al. | |
| 2010/0088454 A1* | 4/2010 | Chang | G06F 1/3215 710/313 |
| 2010/0177901 A1* | 7/2010 | Bates | G06F 21/80 380/278 |
| 2010/0192230 A1 | 7/2010 | Steeves et al. | |
| 2010/0201400 A1 | 8/2010 | Nardone et al. | |
| 2010/0235655 A1* | 9/2010 | Tauscher | G06F 1/266 713/300 |
| 2011/0060858 A1* | 3/2011 | Chiang | G06F 3/0679 710/306 |
| 2011/0102443 A1 | 5/2011 | Dror et al. | |
| 2011/0131423 A1 | 6/2011 | Ponsini | |
| 2011/0258460 A1 | 10/2011 | Pizano et al. | |
| 2011/0314468 A1 | 12/2011 | Zhou et al. | |
| 2012/0017197 A1 | 1/2012 | Mehta et al. | |
| 2012/0151109 A1* | 6/2012 | Cheah | G06F 1/3253 710/113 |
| 2012/0192129 A1 | 7/2012 | Bowers | |
| 2013/0046993 A1* | 2/2013 | Jueneman | G06F 21/32 713/186 |
| 2013/0067534 A1 | 3/2013 | Soffer | |
| 2013/0167254 A1* | 6/2013 | Gyllenskog | G06F 21/606 726/30 |
| 2013/0212671 A1 | 8/2013 | Wang et al. | |
| 2013/0238908 A1 | 9/2013 | Pizano | |
| 2013/0254838 A1* | 9/2013 | Ahuja | G06F 17/30592 726/1 |

OTHER PUBLICATIONS

Landau, at al., "SlitX: S;lit Guest/Hypervisor Execution on Multi-Core", 3$^{rd}$ Workshop of IO irtualization, Jun. 14, 2011, pp. 1-7.

International Search Report and Written Opinion issued Nov. 26, 2014 in corresponding PCT/US2014/051670.

International Preliminary Report on Patentability for International Patent Application No. PCT/US2014/051670, mailed on Mar. 3, 2016, 9 pages.

\* cited by examiner

METHOD AND APPARATUS FOR SECURING COMPUTER INTERFACES

FIELD OF THE INVENTION

A system and method for securing computer systems with otherwise non-secure interfaces between a host processor and connected devices. Embodiments of the invention implement I/O security functions such as transparent data encryption, device gatekeeping, and traffic snooping.

BACKGROUND OF THE INVENTION

Conventional computing devices typically include one to many conventional types of input/output (I/O) ports for communicating with connectable external devices such as mice, keyboards, wireless modems, etc. Such computing devices further include one or more internal connections between a host processor (e.g. CPU) with internal devices such as storage devices (e.g. SATA/SAS drives). In conventional devices, these internal and external communications are rarely secured.

With respect to I/O ports, for example, Universal Serial Bus (USB) is a standard communication protocol between a host computer and peripheral devices. However, USB does not provide any level of security for the data transmitted from the peripheral devices to the host system. This poses a huge risk for enterprises, and more particularly, IT administrators who are responsible for securing their IT systems and devices.

Conventional computer interfaces such as USB are inherently not secure for several reasons. One reason is that USB data is sent in plain text. The data can be captured and analyzed by any USB protocol analyzer or software application. Another reason is that any USB peripheral is capable of connecting to a host computer since USB specification doesn't provide any means to filter unwanted or potentially harmful devices.

SUMMARY OF THE INVENTION

The present invention relates to methods and apparatuses for securing otherwise unsecured internal and external interface communications that addresses the above shortcomings among others. According to one aspect, the invention relates to methods and apparatuses for implementing I/O device gatekeeping, in which prohibited peripheral devices are blocked from attaching and/or communicating with a computer system host. According to another aspect the invention relates to methods and apparatuses for encrypting and decrypting data sent over an I/O connection, in a manner that is transparent to the computer system host. According to another aspect, the invention relates to methods and apparatuses for implementing device snooping, in which some or all traffic passing between a host and a connected device is captured into memory and analyzed in real time by system software. In embodiments, the software can also act upon analyzed information. For example, it can send a notification to a system administrator, or proactively disable a device that violates policies set by the administrator. According to certain additional aspects, the security functions performed by methods and apparatuses according to the invention are logically transparent to the upstream host and to the downstream device. For example, from a USB and SATA protocol standpoint, for example, embodiments of the invention act as a "bump in the wire". In embodiments, the transparency aspects include embodying the security functions of the invention using software and memory address space on a device separate from the computer system host.

In accordance with these and other aspects, a computer system according to embodiments includes a host processor executing an operating system and applications for generating and using data, an upstream port coupled to the host processor, wherein the upstream port receives the generated data from the host processor and sends the used data to the host processor, a downstream port coupled to a device, wherein the downstream port receives the used data from the device and sends the generated data to the device, and a secure subsystem interposed between the upstream port and downstream port that transparently performs security functions on the data.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable securing otherwise unsecured communications between a host processor and connected devices in a standalone computer device. According to one aspect, embodiments of the invention implement device gatekeeping. According to another aspect, embodiments of the invention implement transparent encrypting and decrypting of data sent over an interface. According to another aspect, embodiments of the invention implement device snooping, in which some or all traffic passing between a host and a connected device is captured into memory and analyzed in real time by system software. According to certain additional aspects, the security functions performed by embodiments of the invention can be logically transparent to the upstream host and to the downstream device.

Figure 1:
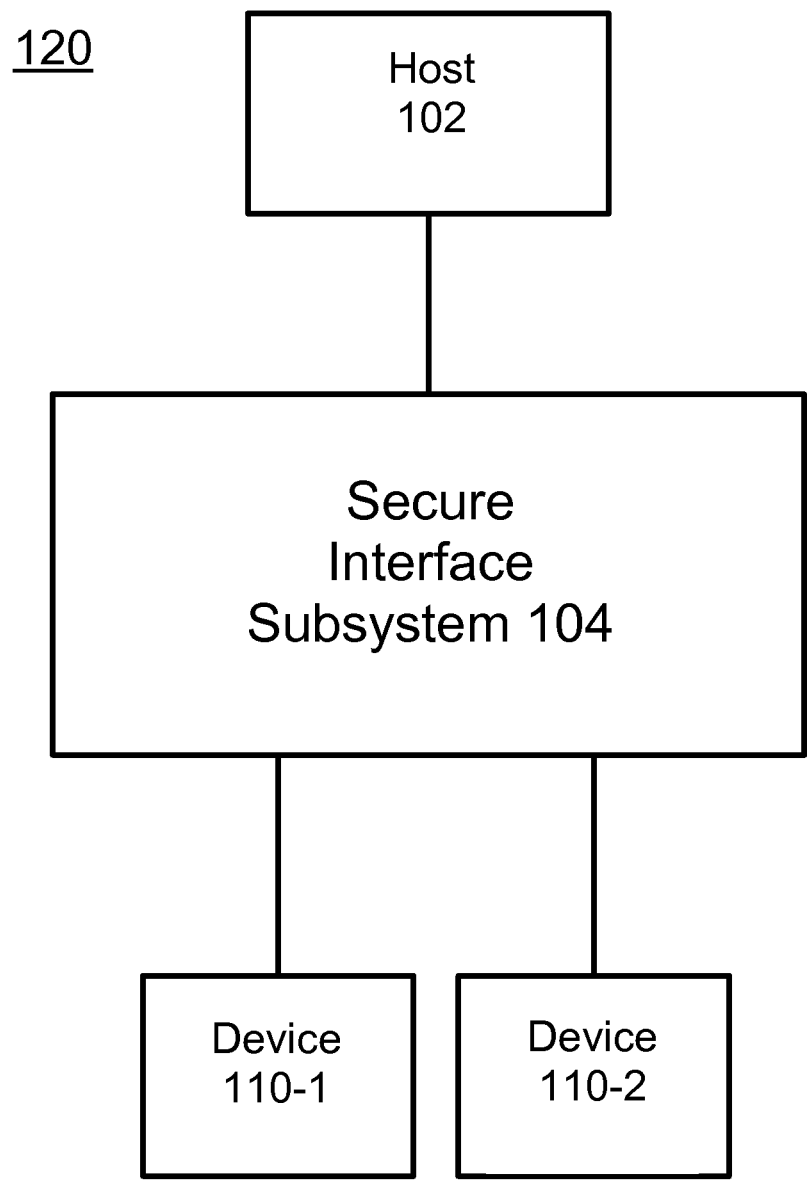
FIG. 1 is a block diagram illustrating an example subsystem for securing I/O communications according to embodiments of the invention.

FIG. 1 is a system level block diagram of a secure computer 120 according to embodiments of the invention. As shown, system 100 includes a Host 102, Secure Interface Subsystem 104, and two directly attached devices 106-1 and 106-2.

The system will look similar for various computer interfaces such as USB, SAS, SATA, Ethernet, Firewire (IEEE 1394), Thunderbolt, etc. Certain types of communications such as Ethernet that do not include host and device roles can also be secured using aspects of the invention. Those skilled in the art will understand how to apply the principles of the invention to such other types of interfaces after being taught by the present disclosure.

In embodiments, a single subsystem 104 can control a plurality of different types of communications. In other embodiments, a subsystem 104 controls communications for only one single type of interface (e.g. USB), in which case there may be several instances of subsystem 104 for each type of interface.

There are many possible configurations of computer 120, host 102, subsystem 104 and attached devices 110 that all fall within the scope of the invention, and the present invention is not limited to any particular configuration. In one non-limiting example configuration, secure computer 120 includes a standalone computer system, similar to a conventional desktop, laptop or pad (i.e. tablet) computer. In such an example, host 102 includes a CPU (e.g. x86, PowerPC, etc.), a conventional operating system such as Windows, associated device driver software, and interface hosts such as SATA hosts and USB hosts. In accordance with certain aspects of the invention, in this example, the operation and functionality of subsystem 104 is completely transparent to the host 102 and associated operating system and application software. Moreover, the operating experience of computer 120 by a user is identical to the experience of a conventional desktop, laptop or pad computer, apart from the security functionality of the present invention. So while the application software that can run on the computer is virtually unrestricted, use of devices 110 is strictly controlled by subsystem 104 which enforces security policies as will be described in more detail below.

In these and other embodiments, subsystem 104 is preferably an embedded system. As such, it runs a designated software system furnished together with an embedded processor, and can not be modified or accessed by the end-user of the computer under any circumstances. An example architecture for implementing subsystem 104 together with host 102 is described in co-pending application Ser. No. 13/971,651, the contents of which are incorporated by reference herein. Those skilled in the art will understand how to implement the principles of the present invention in various configurations of computer 120 after being taught by the present disclosure.

Devices 110 can include peripheral devices such as keyboards, mice, touchpads, touchscreens, printers, etc. that use interfaces such as USB. The number and type of peripherals can depend on the particular form factor of computer 120. For example, in embodiments of the invention where the form factor is that of a conventional desktop computer, the peripherals can include a keyboard and a mouse, which are externally attached. Where the form factor is that of a conventional notebook computer, the peripherals can include an integrated keyboard and touchpad. Where the form factor is that of a tablet computer or smart phone, the peripherals can include an integrated touchscreen. It should be noted that peripherals between different types of form factors for computer 120 are not necessarily mutually exclusive, nor are they constant over time. For example, many conventional touchpad computer systems may be operated with optional separate keyboards and mice (e.g. connected through USB or Bluetooth). Likewise, many conventional desktop computer systems may be operated with optional touchscreens or voice-command devices.

Devices 110 can also include internal and external storage devices such as disk drives, thumb drives, memory cards, etc. Devices 110 can still further include network access interfaces such as Ethernet, Firewire, etc.

In embodiments, all interfaces of a computer 120 have their access controlled by subsystem processor 104. However, this is not necessary in all embodiments of the invention. In some possible embodiments, at least the most useful or security-prone interfaces of the computer 120 are controlled, such as all storage and network access devices (e.g. USB, SATA, Ethernet, etc.), while other interfaces such as keyboards and mice are not controlled (though controlled access to, and some monitoring of these other interfaces may still be performed).

Figure 2:
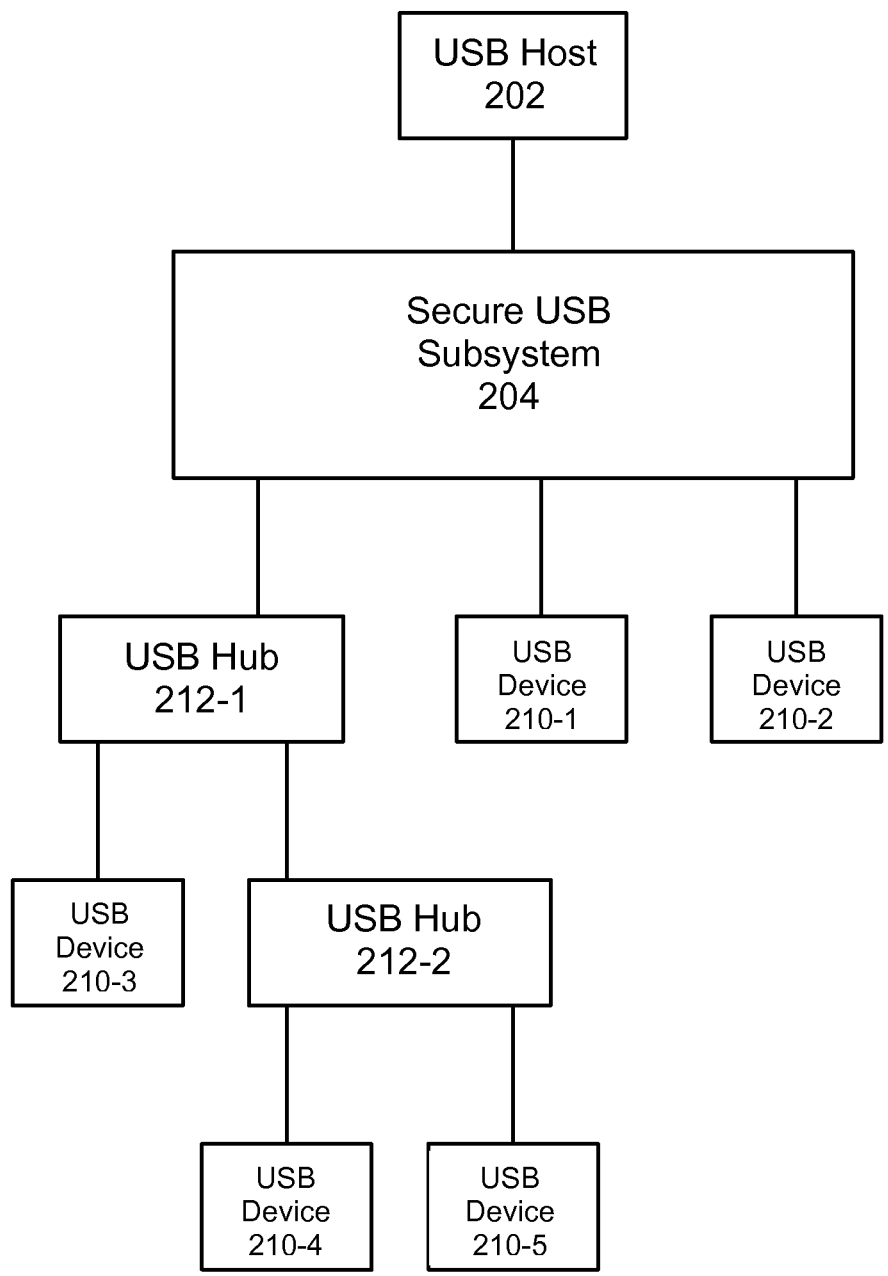
FIG. 2 is a block diagram illustrating another example subsystem for securing USB I/O communications according to embodiments of the invention.

FIG. 2 is a block diagram illustrating another example secure computer 220 according to embodiments of the invention. In this example, the type of I/O is USB. As is known, USB allows a more complex topology, and this diagram illustrates how the invention can be applied to this and other types of I/O with such topologies. For example, as shown in FIG. 2, computer 220 includes USB Host 202, two USB Hubs 212-1 and 212-2, and five USB devices 210-1 to 210-5 connected either directly to the Secure USB Subsystem 204 or via USB Hubs 212-1 and 212-2. It should be noted that a typical PC has many USB ports associated with a single USB host because there is an internal USB Hub that allows port multiplication (not shown in FIG. 2).

Aspects of the invention will now be described in connection with USB being the type of I/O that is being secured. However, the invention is not limited to this type of I/O and those skilled in the art will be able to understand how to apply these detailed descriptions to other types of I/O, including those not having host/device roles, after being taught by these descriptions.

Figure 3:
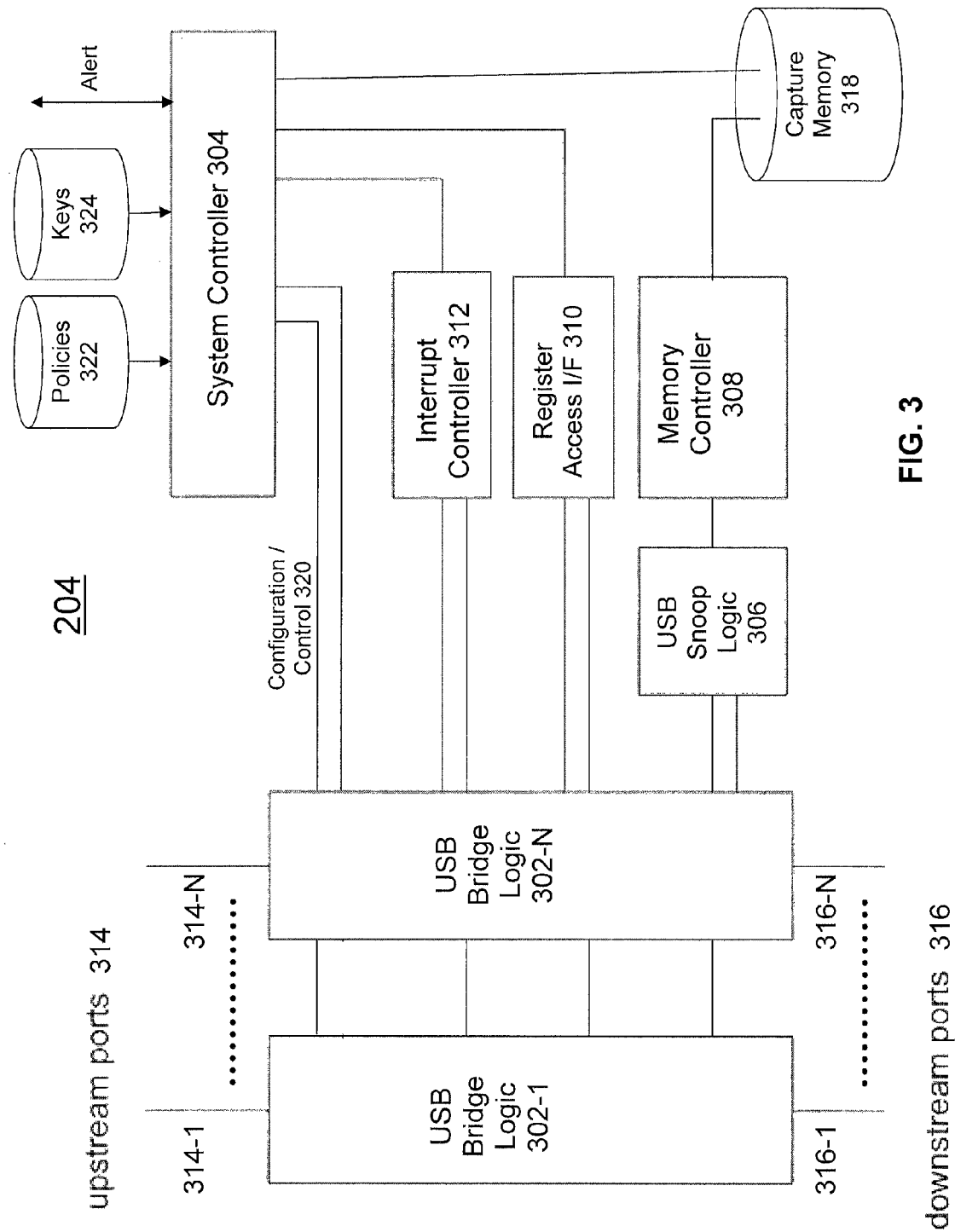
FIG. 3 is a more detailed block diagram illustrating an example subsystem that can be included in the systems shown in FIGS. 1 and 2 according to embodiments of the invention.

FIG. 3 is a block diagram illustrating an example implementation of a Secure USB subsystem 204 according to embodiments of the invention. In this example, subsystem 204 includes one or more instances of USB Bridge Logic 302-1 to 302-N, a system controller 304, USB snoop logic 306, memory controller 308, register access interface 310 and interrupt controller 312.

Each of USB Bridge Logic 302-1 to 302-N is respectively connected between an upstream port 314-1 to 314-N and a downstream port 316-1 to 316-N. The upstream port 314 can be connected to a USB host, either directly or via a USB hub. The downstream port 316 can be connected to a USB device, either directly or via a USB hub.

USB Snoop Logic 306 receives all USB traffic between all USB devices and USB hosts attached to ports 314 and 316. USB Snoop Logic 306 formats the captured USB traffic into blocks for storage in memory. Although not shown in detail in FIG. 3, embodiments of USB Snoop logic module 306 consist of a Trigger Engine for triggering traffic capture (e.g. triggering on certain events), a Filter Engine to filter the captured traffic (e.g. removing any traffic data that is not useful for further analysis), and a Capture Block Builder to format the captured traffic for storage (e.g. adding metadata such as timestamps and channel identifiers). Memory controller 308 stores captured USB traffic that has been formatted by logic 306 to memory 318.

According to general aspects of the invention, the trigger and filter engines help limit that amount of traffic written to memory, because the volume of USB and other interface data of a typical computer can rapidly fill conventional storage capacities and/or consume conventional network bandwidth. An example implementation of Snoop Logic 306 that can be used in the present invention is described in more detail in co-pending application Ser. No. 13/971,604, the contents of which are incorporated herein by reference in their entirety.

Register Access Interface 310 allows bridge logic 302 to access information such as configuration and status stored in USB Bridge registers on system controller 304.

Interrupt Controller 312 allows bridge logic 302 to provide asynchronous notifications to the system controller 304 depending on events detected by logic 302.

Logic 306, memory controller 308, register access interface 310 and interrupt controller 312 can be implemented by any combination of hardware, software and/or firmware. In one embodiment described in more detail in co-pending application Ser. No. 13/971,651, they are together implemented by an ASIC or FPGA.

Configuration/control 320 lines are shown to illustrate additional communications between system controller 304 and bridge logic blocks 302-1 to 302-N.

System controller 304 can be implemented by a processor core with associated software and/or firmware, a FSM in ASIC/FPGA, etc. An example implementation is described in more detail in co-pending application Ser. No. 13/971,651. Controller 304 accesses policies 322 and keys 324. In response to new devices being detected by any USB bridge logic 302, perhaps after consulting policies 322, it determines how the device should be configured for secure use, if at all. It then provides any configuration to the associated bridge logic 302, perhaps also including an encryption key from store 324. Although policies 322 and keys 324 are shown as being maintained locally with controller 304 in this example, that is not necessary. For example, one or both of policies 322 and keys 324 can be maintained remotely and communicated to system controller 304 via a network connection, for example. An example system for managing policies and/or keys that can be used in the present invention is described in more detail in co-pending application Ser. No. 13/971,711, the contents of which are incorporated by reference herein in their entirety.

System controller 304 can also analyze USB traffic that has been captured into memory 318 in real time. For example, such an analysis can include looking for keywords either singly or in combination, performing pattern matching, looking for specific filenames, etc. These and other example analyses are described in more detail in co-pending application Ser. No. 13/971,604. System controller 304 can also act upon analyzed information. For example, it can send a notification to the system administrator, or proactively disable a device that violates policies set by an administrator and stored in policies 322.

Policies 322 define how USB devices are configured for secure communication. Policies 322 can include actions such as whether to block communications to a device (i.e. gatekeeping), encrypt communications to a device, analyze communications to detect certain types of traffic, and/or to fully allow communications without any interruption. The identification of devices can be any level of specificity. For example, whole classes of devices such as mice or keyboards can be identified as not requiring any security. Likewise, an entire class of device such as a thumb drive can be identified as requiring encryption. The identification can be more specific, for example by device vendor and product ID or device unique serial number. Still further, device gatekeeping may also be dependent on contents of the device (e.g. detected or potential presence of a virus, inclusion of sensitive material on the Device, etc.), detection of unsafe and/or promiscuous Device capabilities (e.g. bridging capabilities to an open network), etc. Policies 322 can also be determined based on the user of computer 120 (e.g. administrator privileges, etc.) These and other aspects of policies that can be implemented by the present invention are further described in co-pending U.S. application Ser. No. 13/971,711.

Keys 324 include any type of encryption key used by any suitable encryption algorithm. Example implementations of keys 324 and encryption/decryption algorithms that can be used in the present invention are described in more detail in co-pending application Ser. No. 13/971,632, the contents of which are incorporated herein by reference in their entirety.

The overall structure of subsystem 204 shown in FIG. 3 looks similar for other types of interfaces, and it should be noted that a single computer 120 can include these and other types of secure subsystems, depending on the number and type of interfaces included in computer 120. Accordingly, the present invention can include secure subsystems for these other types of interfaces. An example secure subsystem for securing (e.g. encrypting/decrypting, virus scanning, snooping, capturing, taking snapshots, etc.) SATA interface data (e.g. data stored in a HDD/SDD drive), wherein bridge logic is coupled between a SATA host and a SATA device is described in co-pending application Ser. No. 13/971,732, the contents of which are incorporated herein by reference. An example secure subsystem for securing (e.g. encrypting/decrypting, analyzing, watermarking, capturing, etc.) computer audio and video data (e.g. audio and video displayed on a monitor and/or captured by input devices such as microphones, cameras and webcams), wherein bridge logic is coupled between host audio and video subsystems and audio and video output devices is described in co-pending application Ser. No. 13/971,692, the contents of which are incorporated herein by reference.

Figure 4:
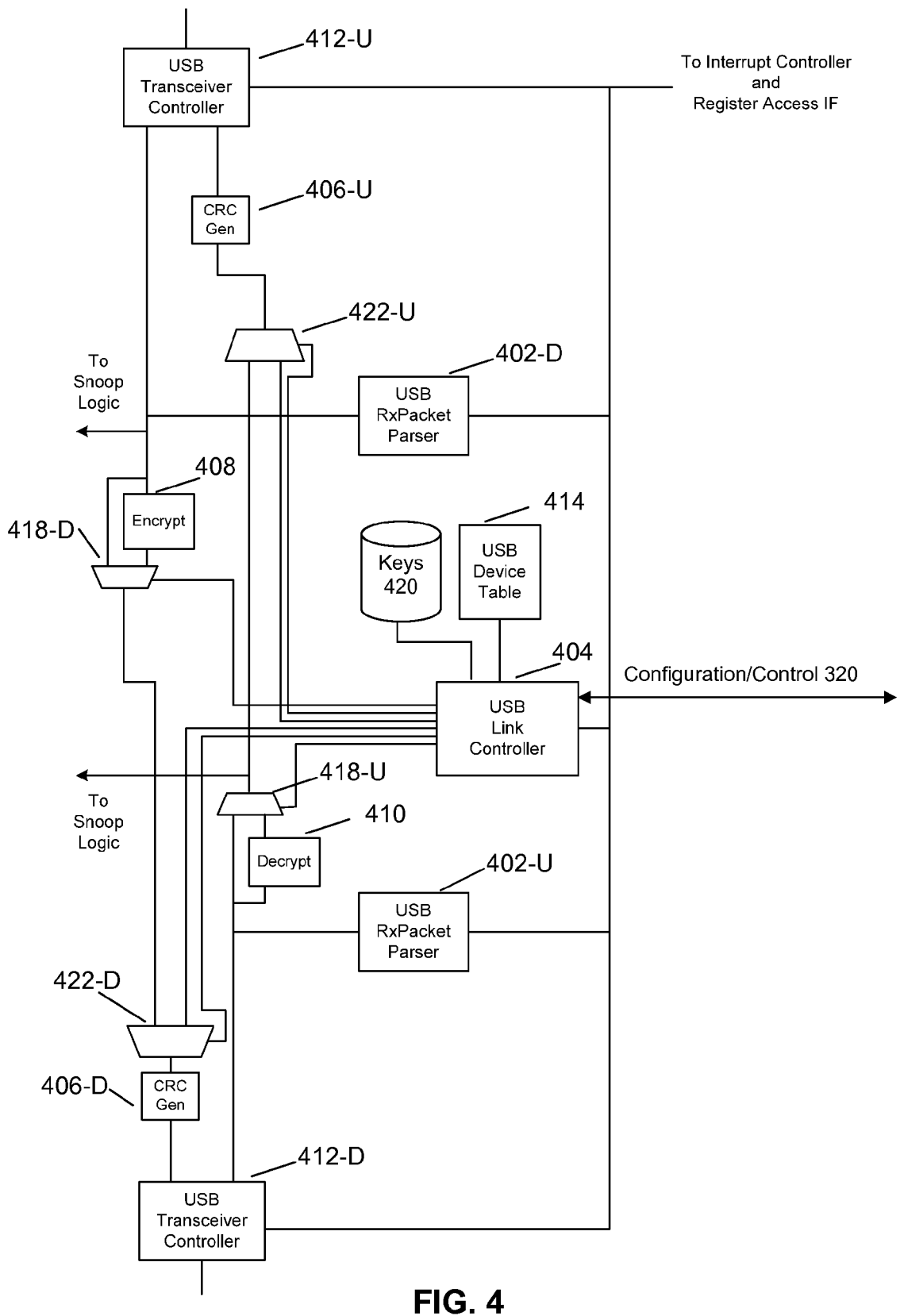
FIG. 4 is a block diagram illustrating an example configuration of bridge logic that can be included in a subsystem such as that shown in FIG. 3.

FIG. 4 is a block diagram of one example implementation of USB Bridge Logic 302 according to embodiments of the invention.

In the example shown in FIG. 4, logic 302 includes USB Receive Packet Parser 402-D (for downstream data) and 402-U (for upstream data), USB Link Controller 404, CRC generator 406-D (for downstream data) and 406-U (for upstream data), encryption module 408 (for downstream data) and decryption module 410 (for upstream data), USB transceiver controller 412-U (for coupling to upstream ports) and 412-D (for coupling to downstream ports), USB device table 414 and encryption keys 420.

USB Receive Packet Parser 402 (both upstream and downstream) is responsible for parsing received packets, decoding packet headers, extracting the header information and passing it to the Link Controller 404. As shown, all received USB packets from upstream ports are also sent to snoop logic 306 before encryption (if needed) and all received USB packets from downstream ports are also sent to snoop logic 306 after decryption (if needed).

In general, USB Link Controller 404 performs a variety of functions for managing the passing of USB traffic between upstream and downstream ports, performing device gatekeeping, and performing data encryption and decryption according to configurations provided by system controller 304.

Using messages parsed by upstream packet parser 402-U, USB Link Controller 404 detects direct attachment of a new device to a downstream port, and also detects attachment of a new device to one of the USB hubs connected to a downstream port. The latter is performed by monitoring hub port change messages sent to the host.

Also using messages parsed by upstream packet parser 402-U, USB Link Controller 404 detects removal of a device directly connected to a downstream port, and detects removal of a device from one of the USB hubs connected to a downstream port. The latter is performed by monitoring hub port change messages sent to the host.

When device attachment and removal is detected, USB Link Controller 404 raises an interrupt to the system controller 304 via interrupt controller 312 and sends a report of all device attachment and removal information to the system controller 304 via configuration/control lines 320. Using the information regarding attached and removed devices, USB Link Controller 404 also maintains table 414 of all connected devices. For example, USB Link Controller 404 parses descriptors during device enumeration and extracts information such as device class, device manufacturer, product ID, serial number and additional identifying information. Accordingly, in embodiments, the table 414 contains information about device address, endpoints, device class, and serial numbers of all attached USB devices.

An example structure of table 414 as shown in TABLE 1 below.

TABLE 1

| Dev. Name | Dev. ID | Key ID | Offline? | Line Lock | Dev. caching method |
|---|---|---|---|---|---|
| Dev1 | | | | | |
| Dev2 | | | | | |
| Dev3 | | | | | |
| ... | | | | | |
| ... | | | | | |

Although shown only as one column in the table above, in embodiments the Device ID column can include several sub-columns, such as device class, serial number, vendor/manufacturer name.

In embodiments, the Offline? column includes a flag that tells whether this particular device is allowed to be connected when in an offline mode. Offline mode is when there is no control of communications by subsystem 204 (e.g. control by a Remote Management System such as that described in co-pending application Ser. No. 13/971,711, such as when system 100 is not connected to a secure network.

In embodiments, the device caching method column consists of several sub-columns that contain all the necessary information for managing the caching of Device encryption keys. The table can store currently connected devices as well as devices that have connected in the past with their associated keys (if allowed to by a remote management system, for example). The table is preferably limited in capacity so if it fills up there needs to be a priority mechanism for how to make room for a new entry.

The sub-columns of the device caching method column can include fields such as: Timestamp—when a device connected, disconnected; Priority—lowest priority will be cleared from cache first when table/cache is full and a new device is connecting; Cache line lock: indicates that this device entry should not be removed from table.

In response to reports of newly attached devices, system controller 304 provides configuration information to USB Link Controller 404, perhaps using information in policies 322 (or after querying a remote management system). This information can include whether to block communications to the device (i.e. gatekeeping), encrypt communications to the device or to fully allow the communications without any interruption. This configuration information can also be maintained in table 414 or obtained online from a remote management system.

USB Link Controller 404 also includes logic for managing encryption keys 420. For example, when a device has been configured for encrypted communications, system controller 304 may further provide an encryption key to use for that device. USB Link Controller 404 stores the encryption key in store 420 and associates it with the configured device. USB Link Controller 404 also includes logic for holding off USB traffic during the process of receiving an encryption key.

In response to packets being received on an upstream port 314 and being destined for a device for which encryption is configured, USB Link Controller 404 enables payload encryption in the downstream direction by controlling mux 418-D.

In response to packets being received on a downstream port 316 and being originated from a device for which encryption is configured, USB Link Controller 404 enables payload decryption in the upstream direction by controlling mux 418-U.

USB Link Controller 404 also includes logic to implement device gatekeeping functionality. In embodiments, when a device has been configured for gatekeeping, the actual upstream packets from the attached device are discarded. For example, when a USB device (e.g. thumb drive) is first attached and detected by link controller 404, and link controller 404 determines from policies 322 and/or system controller 304 that the device should be blocked, all subsequent packets received from the device are discarded and not forwarded upstream to a USB host at all. In this example, the host computer simply does not know there is a new USB device attached and so does not attempt to communicate with it. The system controller 304 can also cause an error message to be displayed on the secure computer display, or provide other types of notifications.

Another implementation option is not to simply discard packets, but to terminate packet transactions in a more "graceful" way. For example, in some operating systems such as Windows, simply discarding packets can lead to shutdown of the entire USB port. Terminating a transaction gracefully means that USB Link Controller 404 sends appropriate packets back to the USB Host (instead of passing original packets from the Device), which forces the Host to complete its initialization sequence and discard the device.

In certain embodiments and circumstances, replacement packets are sent in place of discarded packets by controlling muxes 422-U and 422-D. For example, replacement packets can be generated or not depending on the USB link speed, with no replacement packets being generated for higher speed links When generated, replacement packets include NAK packets that reject the transaction (instead of ACK), or packets with invalid CRC (force corrupted packet). The exact packet contents depend on the USB version: USB 1.1, 2.0, 3.0 and subsequent ones.

As is known, all USB packets include a 16-bit CRC value based on the payload contents. This value is no longer valid if packets are encrypted or replacement packets are generated as part of the gatekeeping function. Accordingly, Cyclic Redundancy Check (CRC) generator module 406 (for both upstream and downstream directions) generates a new CRC value for all new or modified USB packets inserted by the Link Controller 404.

Encryption module 408 encrypts the payload inside USB packets using the appropriate key stored for a device in 420 before passing the packet to the downstream USB device. USB Link Controller 404 decides which packets require encryption, and also which key(s) to use, and controls mux 418-D appropriately.

Decryption module 410 decrypts payload inside USB packets using the appropriate key stored in 420 for the device before passing the packet to the upstream USB host. USB Link Controller 404 decides which packets require decryption, and also which key(s) to use, and controls mux 418-U appropriately.

Example techniques for performing encryption and decryption that can be practiced together with the present invention are described in more detail in co-pending application Ser. No. 13/971,632.

USB Transceiver controller 412 implements interface logic to external USB Phy.

Figure 5:
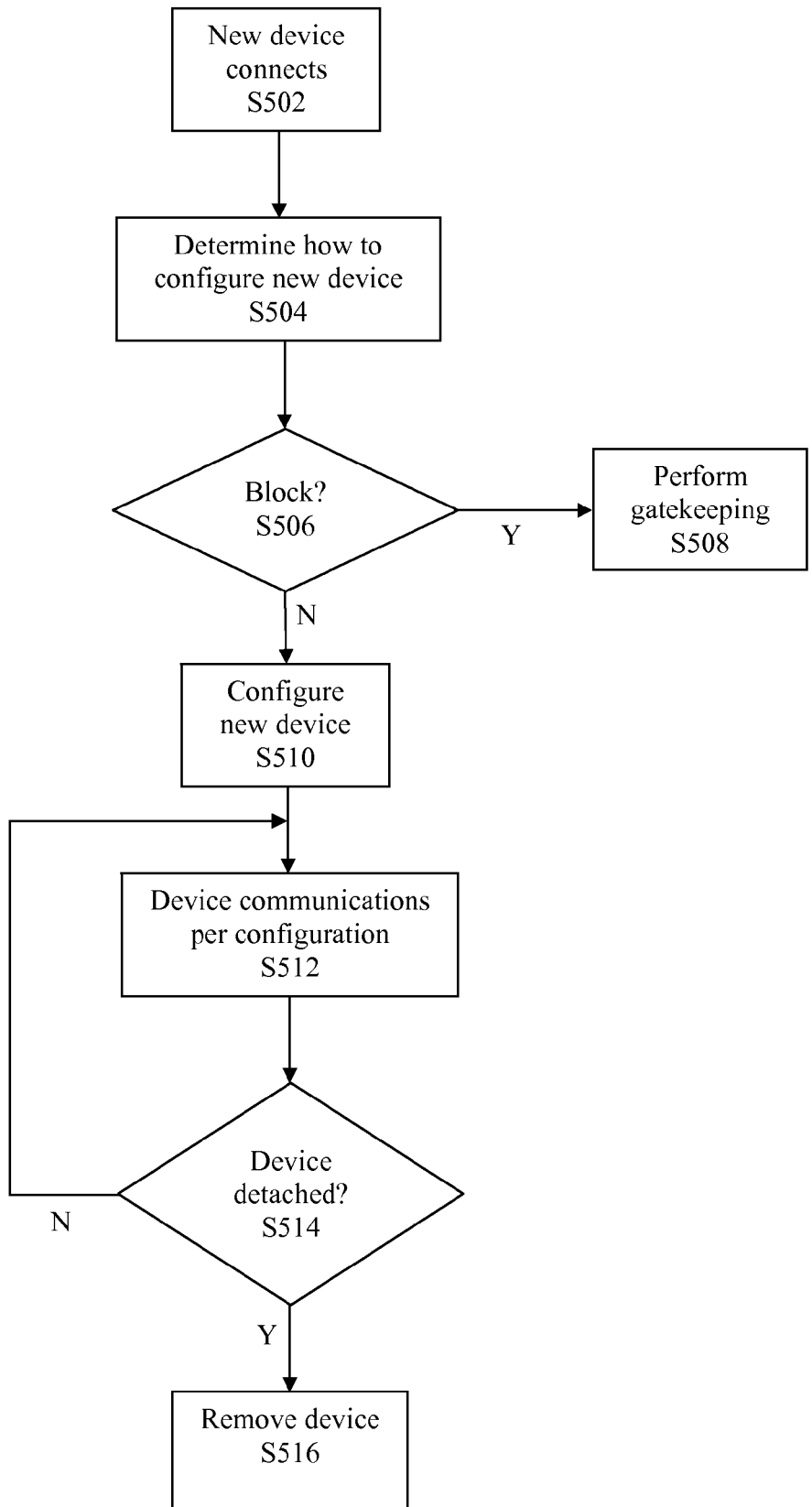
FIG. 5 is a flowchart illustrating an example methodology for configuring and/or securing I/O communications according to embodiments of the invention.

FIG. 5 is a flowchart illustrating an example method of configuring and/or securing communications with a USB device according to embodiments of the invention.

As shown in FIG. 5, processing begins in step S502, when a new USB device is detected. For example, when a USB device is first connected to a USB host, a standard device enumeration process is started, which begins by sending a reset signal to the USB device by USB transceiver controller 412-D. Thereafter, the enumeration process is monitored by bridge logic 302 and information regarding the newly connected USB device is collected. This information is used to create a new entry in table 414 and is also sent to system controller 304.

Next in step S504 system controller 304 accesses policies 322 to determine how to configure the device for communications with upstream host(s). Based on this determination, system controller 304 sends the necessary configuration information to bridge logic 302. In other embodiments, rather than consult locally-stored policies, subsystem 204 may communicate with another system or administrator to determine how to configure the device.

In step S506 it is determined if this device has been configured for gatekeeping. For example, certain types of devices such as thumb drives can be configured to be blocked from attaching to the computer 120. Alternatively, only a thumb drive having a specific ID or serial number can be approved for attachment. If it is determined from the configuration information that the device is to be blocked, gatekeeping is performed in step S508. For example, all packets from the device are discarded and the upstream host is never aware of the new device. As another example, the device is removed by causing the host to terminate gracefully. Additionally, an error message or other notification may be presented to the host user or a system administrator. The event can also be logged.

Otherwise, in step S510 the bridge logic 302 configures the device for communications as specified by system controller 304. For example, if the configuration specifies that communications should be encrypted, the configuration information could have included an encryption key to use. The key is stored and associated with the device by logic 302.

Thereafter, in step S512 communications between the device and the upstream host are performed in accordance with the specified security configuration. For example, if communications with the particular device are to be encrypted, logic 302 causes the encryption and decryption blocks in the upstream and downstream directions between the host and device to perform encryption and decryption using the appropriate key.

In certain cases, the configuration could have specified that analysis of communications associated with the device needs to be snooped. If so, snoop logic 306 is configured to capture and store the type of traffic that is of particular interest and store it in memory 308. It should be noted that certain types of devices can have all of their traffic stored (e.g. keyboard and mice data for analyzing or storing user inputs, webcam inputs, etc.).

In still other cases, the configuration could have specified that no security functions need be performed at all, in which case traffic between the host and device flows as if subsystem 204 is not present at all.

Device communications proceed as described in step S512 until the link controller 404 determines in step S514 if the device has been removed. If so, removal processing in step S516 can include updating a device table and/or sending a notification to an administrator, remote management system, etc.

Figure 6:
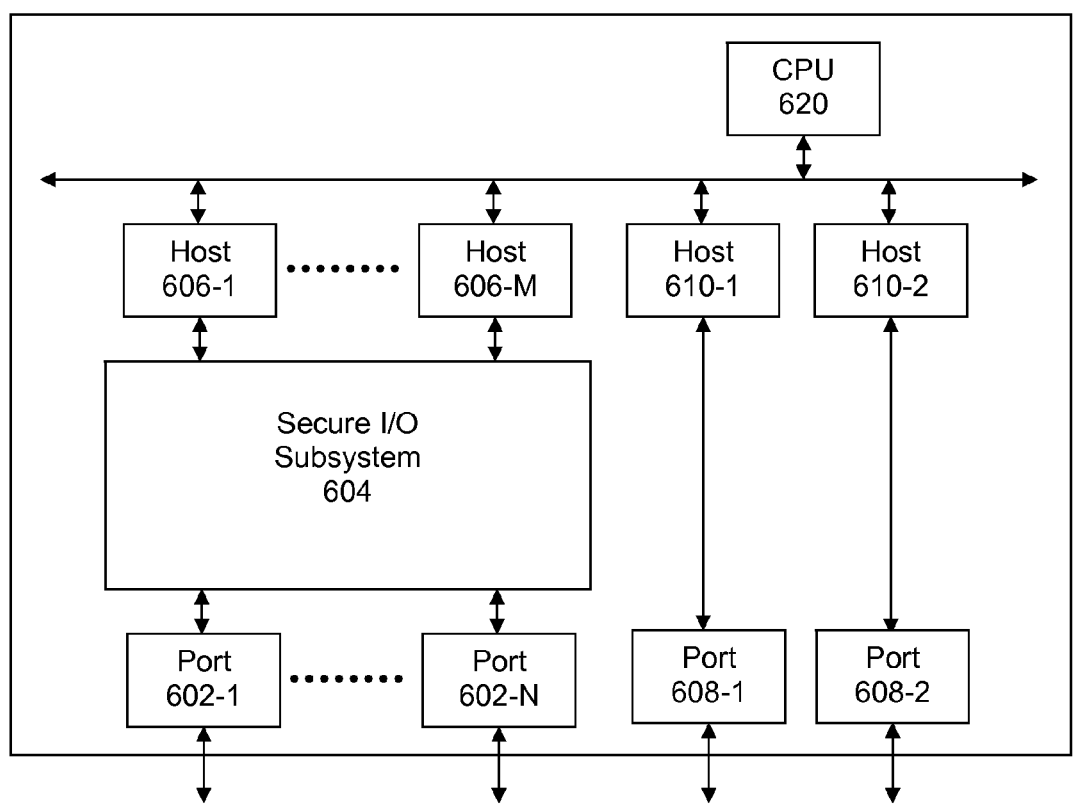
FIG. 6 is a block diagram illustrating aspects of implementing embodiments of the invention in a computing device such as a PC.

FIG. 6 is a block diagram illustrating an example system in which secure I/O can be included.

As shown, system 600 can be a PC, server, or other type of computer having a CPU 620 and system bus 622. According to aspects of the invention, system 600 further includes a plurality of I/O ports 602-1 to 602-N, for example USB ports. Secure I/O subsystem 604 is connected between these ports and I/O hosts 606-1 to 606-M for controlling secure communications via these ports 602 in accordance with aspects of the invention. As shown, system 600 can also include other I/O ports 608-1 to 608-P, which may or may not have associated hosts 610, and which are not controlled by subsystem 604.

According to aspects of the invention, devices connected to ports 602 appear to hosts 606 and CPU 620 like any other devices, and the security functions performed by subsystem 604 can be done transparently to hosts 606 and/or 620.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer system, comprising:
   a host processor executing an operating system and applications for generating and using data;
   an upstream port coupled to the host processor, wherein the upstream port receives the generated data from the host processor and sends the used data to the host processor;
   a downstream port coupled to a device, wherein the downstream port receives the used data from the device and sends the generated data to the device; and
   a secure subsystem interposed between the upstream port and downstream port that transparently performs security functions on the data, wherein the secure subsystem includes logic that detects when the device first connects to the downstream port and configures the security functions that are performed in response to the detection,
   wherein the security functions include a gatekeeping function in which the secure subsystem, upon determining that the device should be blocked, causes the host processor to consider that the device is not connected to the downstream port, thereby preventing any subsequent requests to access the device by the host processor,
   wherein the secure subsystem causes the host processor to consider that the device is not connected by communicating information with the host processor that causes the host processor to terminate an initialization sequence with the device and discard the device, and
   wherein communicating information includes sending packets from the secure subsystem to a device host in the operating system executed by the host processor which forces the device host to complete the initialization sequence but to keep the downstream port open so that another device can attach to the downstream port.

2. The computer system of claim 1, wherein the host processor includes a Universal Serial Bus (USB) host and the device comprises one or more of a USB device and a USB hub.

3. The computer system of claim 1, wherein the host processor includes one or more of a Serial Advanced Technology Attachment (SATA) host and a Serial Attached SCSI (SAS) host and the device comprises one or more of a SATA device and a SAS device.

4. The computer system of claim 1, wherein the secure subsystem includes transceivers for parsing packets of the data received from the upstream and downstream ports and a link controller for examining the parsed packets.

5. The computer system of claim 1, wherein the secure subsystem transparently encrypts the generated data before sending to the device.

6. The computer system of claim 5, wherein the secure subsystem includes a Cyclic Redundancy Check (CRC) generator for generating a new CRC value for the encrypted generated data.

7. The computer system of claim 1, wherein the secure subsystem transparently decrypts the used data before sending to the host.

8. The computer system of claim 1, further comprising a policies table that defines a number and type of the security functions to perform for the device, wherein the logic configures the security functions by looking up the device in the policies table.

9. The computer system of claim 8, wherein the policies include one or more of device class configuration policies, device vendor configuration policies, product ID configuration policies, and unique device serial number configuration policies.

10. The computer system of claim 1, wherein the security functions capturing certain of the generated and used data, and wherein the secure subsystem includes snoop logic for capturing the certain data.

11. The computer system of claim 10, wherein the snoop logic is configured to store the certain captured data in memory.

12. The computer system of claim 10, wherein the secure subsystem is configured to forward the certain captured data to a system administrator.

13. The computer system of claim 10, wherein the snoop logic is configured to capture the certain data in real time.

14. The computer system of claim 10, wherein the secure subsystem is configured to monitor the certain captured data in real time.

15. The computer system of claim 10, wherein the snoop logic includes a trigger engine that identifies the certain data based on a predefined event.

16. The computer system of claim 10, wherein the snoop logic includes a filter engine that identifies the certain data by discarding unwanted data.

17. A method for securing a computer having an upstream port coupled to a host processor and a downstream port coupled to a device, comprising:
   interposing a secure subsystem between the upstream port and the downstream port;
   detecting when the device first attaches to the downstream port;
   determining at the secure subsystem that the device should be blocked in response to the detection; and
   if the device should be blocked, causing the host processor to consider that the device is not attached to the downstream port, thereby preventing any subsequent requests to access the device by the host processor,
   wherein causing the host processor to consider that the device is not attached is performed by communicating information with the host processor that causes the host processor to terminate an initialization sequence with the device and discard the device, and
   wherein communicating information includes sending packets from the secure subsystem to a device host in the operating system executed by the host processor which forces the device host to complete the initialization sequence but to keep the downstream port open so that another device can attach to the downstream port.

18. The method according to claim 17, wherein the host processor includes a Universal Serial Bus (USB) host and the device comprises one or more of a USB device and a USB hub.

19. The method of claim 17, wherein the host processor includes one or more of a Serial Advanced Technology Attachment (SATA) host and a Serial Attached SCSI (SAS) host and the device comprises one or more of a SATA device and a SAS device.

20. The method according to claim 18, further comprising maintaining a table of policies that defines devices to be blocked, wherein determining includes looking up the device in the table.

21. The method according to claim 20, wherein the policies include one or more of device class configuration policies, device vendor configuration policies, product ID configuration policies, and unique device serial number configuration policies.

* * * * *